United States Patent
Castiel (10) Patent No.: US 8,199,523 B2
(45) Date of Patent: Jun. 12, 2012

(54) SERVER-BASED NETWORK APPLIANCE

(75) Inventor: David Castiel, Even-Yehuda (IL)

(73) Assignee: Silicom Ltd., Kfar Saba (IL)

( * ) Notice: Subject to any disclaimer, the term of this patent is extended or adjusted under 35 U.S.C. 154(b) by 194 days.

(21) Appl. No.: 12/756,201

(22) Filed: Apr. 8, 2010

(65) Prior Publication Data

US 2010/0318708 A1    Dec. 16, 2010

Related U.S. Application Data

(60) Provisional application No. 61/185,673, filed on Jun. 10, 2009.

(51) Int. Cl.
*G06F 1/16* (2006.01)

(52) U.S. Cl. ............ 361/796; 361/679.6; 361/752; 361/733; 361/797; 361/756; 709/249; 709/250

(58) Field of Classification Search ......... 361/679.02, 361/679.31, 679.32, 679.4, 728–733, 741, 361/752–756, 796, 797, 801, 802; 312/223.2, 312/223.3, 332.1, 298, 334.5, 334.7, 334.16; 709/200, 223, 250; 710/62, 300–302, 314, 710/316; 713/224, 300, 320, 322

See application file for complete search history.

(56) References Cited

U.S. PATENT DOCUMENTS

| | | | |
|---|---|---|---|
| 5,325,491 A | 6/1994 | Fasig | |
| 5,460,441 A * | 10/1995 | Hastings et al. | 312/298 |
| 5,592,366 A | 1/1997 | Goldman et al. | |
| 6,147,863 A * | 11/2000 | Moore et al. | 361/679.6 |
| 6,198,633 B1 * | 3/2001 | Lehman et al. | 361/756 |
| 6,507,882 B1 | 1/2003 | Golka et al. | |
| 6,765,791 B2 | 7/2004 | Syring et al. | |
| 6,985,967 B1 * | 1/2006 | Hipp | 709/250 |
| 7,167,380 B2 * | 1/2007 | Ice | 361/796 |
| 7,210,586 B2 * | 5/2007 | Ice | 211/26 |
| 7,236,358 B2 | 6/2007 | Dobbs et al. | |
| 7,254,038 B2 * | 8/2007 | Drako | 361/752 |
| 7,489,522 B2 * | 2/2009 | Hoshino et al. | 361/797 |
| 7,720,385 B2 * | 5/2010 | Dagan et al. | 398/98 |
| 8,064,773 B2 * | 11/2011 | Dagan et al. | 398/135 |
| 2002/0161929 A1 * | 10/2002 | Longerbeam et al. | 709/250 |
| 2002/0199047 A1 | 12/2002 | DuPont et al. | |
| 2004/0004822 A1 | 1/2004 | Ruckerbauer et al. | |

(Continued)

OTHER PUBLICATIONS

Baticle et al., "Combining CompactPCI & USB: A new approach to Industrial Computer", Real-Time Magazine 98-4, pp. 79-97, 1998.

(Continued)

*Primary Examiner* — Michail V Datskovskiy
(74) *Attorney, Agent, or Firm* — D. Kligler I.P. Services Ltd.

(57) ABSTRACT

Communication apparatus includes a case including a front panel and having a rear side opposite the front panel. A computer motherboard includes a processor and a bus having bus slots, and is mounted in the case so that the bus slots are located adjacent to the rear side of the case. One or more communication adapter cards, each of which includes a bus connector compatible with the bus and one or more ports for receiving a communication cable, are mounted in the case so that the ports are accessible at the front panel. Bus extension circuitry is connected inside the case between the bus slots on the motherboard and the one or more communication adapter cards, and includes a backplane including at least one backplane slot, for receiving the bus connector of the one or more communication adapter cards.

26 Claims, 8 Drawing Sheets

U.S. PATENT DOCUMENTS

2006/0200600 A1    9/2006  Groso
2010/0195289 A1*   8/2010  Hubal .......................... 361/733

OTHER PUBLICATIONS

Benner et al., "Exploitation of optical interconnects in future server architectures", IBM Journal of Research & Development, vol. 49, No. 4, pp. 755-775, Jul./Sep. 2005.

International Application PCT/IB2010/051518 Search Report dated Sep. 17, 2010.
Silicom Ltd., "Moving Up the Value Chain: Silicom Introduces Patent-Pending SETAC—Server to Appliance Converter—A Unique Solution for Network Appliances", Israel, Jul. 21, 2009.
Silicom Ltd., "Pyramid Computer GMBH, Leading European Supplier of Appliance Servers, Chooses Silicom's SETAC", Israel, Dec. 15, 2009.

* cited by examiner

SERVER-BASED NETWORK APPLIANCE

CROSS-REFERENCE TO RELATED APPLICATION

This application claims the benefit of U.S. Provisional Patent Application 61/185,673, filed Jun. 29, 2009, which is incorporated herein by reference.

FIELD OF THE INVENTION

The present invention relates generally to digital communication systems, and specifically to computer-based network appliances that are used in such systems.

BACKGROUND OF THE INVENTION

Standard computer motherboards are widely available from various vendors. Because of their broad use, such boards are generally both highly reliable and inexpensive.

A typical standard motherboard contains a central processing unit (CPU), memory, and peripheral devices, connected by a bus, which complies with one of the Peripheral Component Interconnect (PCI) bus standards. Circuit boards with additional peripheral components, such as network adapter cards, may be plugged into the motherboard by means of bus slots on the bus. The bus slots are generally located at the rear of the motherboard in order to allow access to connectors on the plug-in circuit boards at the rear panel of the computer.

U.S. Pat. No. 5,592,366, whose disclosure is incorporated herein by reference, describes a front-loading computer/bus extender. An instrument includes a housing with a front opening in a first loading plane, and instrument receiving slots located in the housing. The chassis can be utilized as a stand-alone computer or it can operate as a bus extender for an existing computer. It is designed to allow top loading PC instrument cards to be front loaded.

U.S. Pat. No. 6,507,882, whose disclosure is incorporated herein by reference, describes an alternate use of computer storage device bays. A module is provided for installation in a drive bay of a computer and is adapted to accommodate expansion circuitry rather than the electromechanical devices conventionally installed in drive bays. A system interface board is provided for insertion into an expansion socket on the computer's motherboard and is connected to the module, thus interfacing the expansion circuitry to the computer.

SUMMARY

Network appliances, unlike standard computers, are typically designed with network ports at their front panel, for convenience of connection and configuration, and in some cases to enable replacement of modules without opening the entire case. Embodiments of the present invention that are described hereinbelow provide novel computer configurations that offer this sort of convenience while using standard computer components.

There is therefore provided, in accordance with an embodiment of the present invention, communication apparatus, including a case, which includes a front panel and has a rear side opposite the front panel. A computer motherboard includes a processor and a bus having bus slots, and is mounted in the case so that the bus slots are located adjacent to the rear side of the case. One or more communication adapter cards, each of which includes a bus connector compatible with the bus and one or more ports for receiving a communication cable, are mounted in the case so that the ports are accessible at the front panel. Bus extension circuitry is connected inside the case between the bus slots on the motherboard and the one or more communication adapter cards, and includes a backplane including at least one backplane slot, for receiving the bus connector of the one or more communication adapter cards.

In a disclosed embodiment, the bus extension circuitry typically includes a bus repeater circuit coupled on the backplane.

Typically, the case is configured for mounting in a rack, and the one or more communication adapter cards are insertable and removable via the front panel while the apparatus is mounted in the rack. The case may have a form factor equal to 1U or 2U. In some embodiments, the motherboard and at least one of the communication adapter cards are mounted horizontally in the case. Alternatively or additionally, at least one of the communication adapter cards may be mounted vertically in the case.

In disclosed embodiments, the one or more communication adapter cards include a communication device for transmitting and receiving signals via the communication cable. The bus may be a high-speed serial bus. Typically, the bus extension circuitry includes at least one plug-in card, which plugs into at least one of the bus slots on the motherboard, and a bus cable, coupled between the at least one plug-in card and the backplane.

There is also provided, in accordance with an embodiment of the present invention, a method for communication, including providing a case including a front panel and having a rear side opposite the front panel. A computer motherboard, which includes a processor and a bus having bus slots, is mounted in the case so that the bus slots are located adjacent to the rear side of the case. One or more communication adapter cards, each of which includes a bus connector compatible with the bus and one or more ports for receiving a communication cable, are mounted in the case so that the ports are accessible at the front panel. Bus extension circuitry is connected between the bus slots on the motherboard and the one or more communication adapter cards, wherein the bus extension circuitry includes a backplane including at least one backplane slot, for receiving the bus connector of the one or more communication adapter cards.

The present invention will be more fully understood from the following detailed description of the embodiments thereof, taken together with the drawings in which:

DETAILED DESCRIPTION OF EMBODIMENTS

Overview

"Network appliances" are special-purpose computers that are designed for use in communication applications, such as switching, routing, security, WAN acceleration and filtering of digital communication traffic. Such appliances generally comprise one or more central processing units (CPUs) and multiple communication interface circuits with ports for receiving standard network plugs. Network appliances are commonly designed to be mounted in standard racks. For ease in configuring and connecting the network appliances in the rack, the ports for connecting to network plugs are typically located in the front panel of the appliance.

Standard servers, on the other hand, are traditionally configured with connectors for communication cables and other peripheral components at the rear panel. The computer motherboard, with bus slots for communication adapters and other peripheral connections, is designed to be mounted in the case of the server so that the bus slots are located adjacent to the rear side of the case. Installation of a communication adapter generally requires that the case be opened and the adapter plugged into one of the slots, whereby the ports are available at the rear panel.

Standard server motherboards and peripheral components are widely available from major vendors. Because of their broad use, such boards and components are generally highly reliable, stable and inexpensive, and run off-shelf operating system software and applications. On the other hand, the mechanical design of these standard elements is inappropriate for use in network appliances, in terms of the rear connections and difficulty they entail in installing and replacing network adapters. For this reason, many current network appliances use special-purpose motherboards and other components.

Embodiments of the present invention that are described hereinbelow provide communication apparatus that may be built around a standard motherboard, bus and peripheral components, in a mechanical configuration that offers the convenience of connection and configuration of a rack-mountable network appliance. A computer motherboard is mounted in a case in the standard manner, so that the bus slots on the motherboard are located adjacent to the rear side of the case. One or more network adapter cards are mounted in the case. These cards are not mounted directly in the bus slots at the rear side, however. Rather, they are mounted at the front so that the ports on the cards are accessible at the front panel of the case.

This configuration is made possible by the incorporation in the case of a backplane for the network adapter cards. Each network adapter card comprises a bus connector, which is compatible with the motherboard bus and plugs into a backplane slot in the backplane. The backplane is connected (typically by a bus extender cable) to one or more of the bus slots on the motherboard and typically comprises one or more bus repeater circuits coupled between the bus slots on the motherboard and the backplane slots. The bus repeater circuit makes it possible to maintain the standard bus connection between the motherboard and the network adapters, even using a high-speed serial bus, such as PCI Express. It thus permits the use of standard server components and operating system software throughout the apparatus, despite the non-standard physical configuration of the appliance.

System Description

Figure 1:
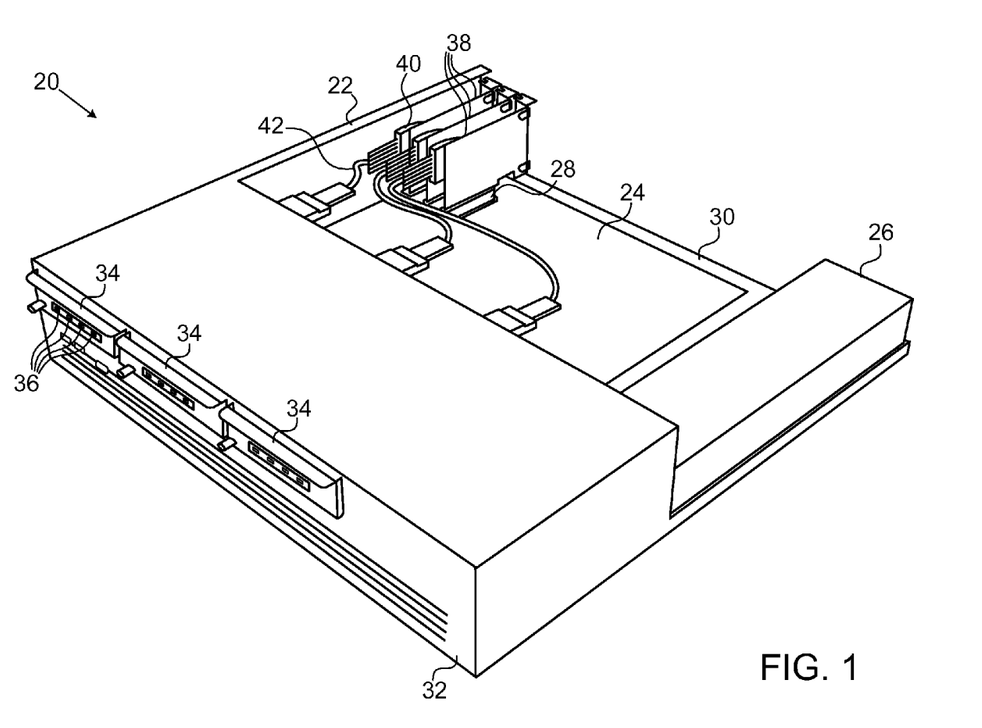
FIG. 1 is a schematic, pictorial illustration of a network appliance, in accordance with an embodiment of the invention.
Figure 2:
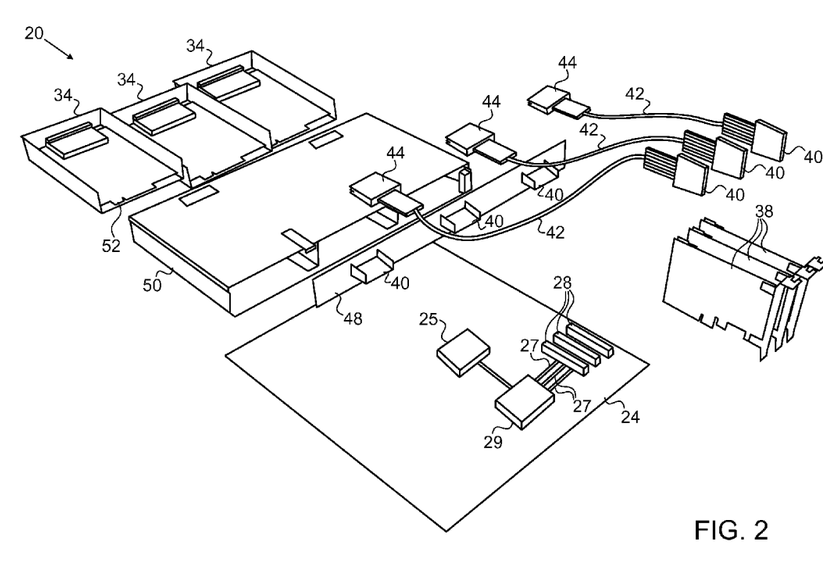
FIG. 2 is an exploded view of the network appliance of FIG. 1.
Figure 3:
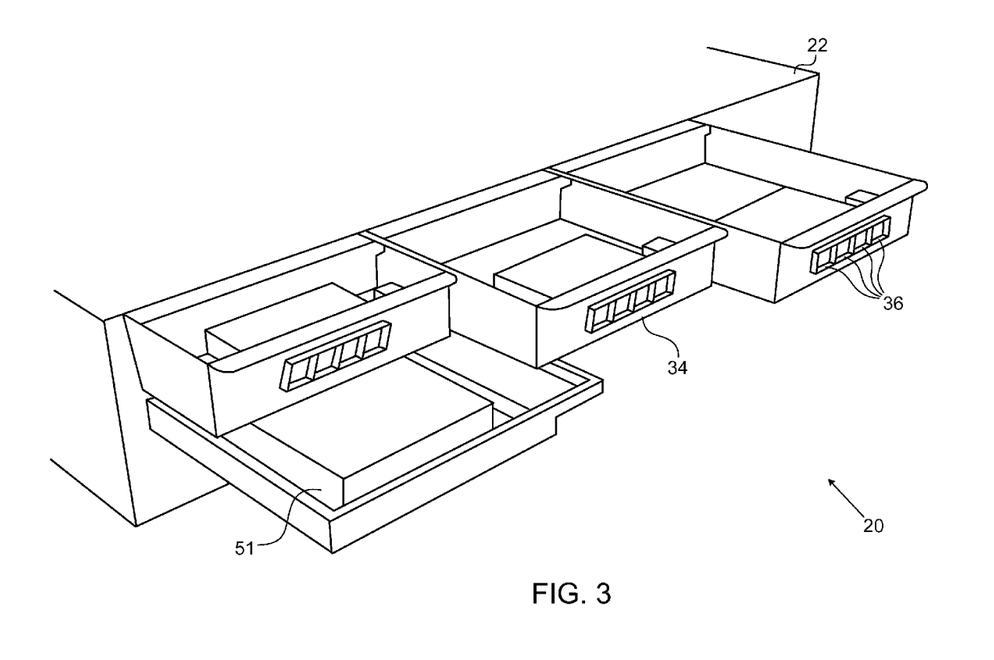
FIG. 3 is a schematic front view of the network appliance of FIG. 1.

FIGS. 1, 2 and 3 schematically illustrate a network appliance 20, in accordance with an embodiment of the invention. FIG. 1 is a pictorial illustration, while FIG. 2 shows an exploded view. FIG. 3 is a detail view of the front side of the appliance.

Network appliance 20 comprises a case 22, having a front panel 32 and a rear side 30. The case may be configured for mounting in a standard communication rack, and thus has a standard form factor (width and height). The pictured embodiment has a 2U form factor, but the case and the components it contains may alternatively be configured with a lower, 1U form factor, or with other suitable form factors depending on application requirements.

Case 22 contains a motherboard 24, with a CPU 25, a bus controller 29, and other standard components (not shown), as well as a power supply 26. A bus, such as a PCI Express high-speed serial bus, comprising bus links 27, interconnects the components on motherboard 24. The bus typically operates at a speed in excess of 1 Gb/s, and may operate at more than 10 Gb/s, although lower bus speeds may alternatively be supported. Cards 38, with standard edge connectors, plug into bus slots 28 on the motherboard. These cards serve as a part of the bus extension circuitry to connect network adapter cards 34, located at front panel 32, to bus (or buses) 27 at the rear of the motherboard. (The bus extension circuitry is described in greater detail hereinbelow.) Cards 38 are located at rear side 30 of case 22, but generally do not themselves have any connectors that are accessible at the rear of the case.

Network adapter cards 34 have ports 36 at front panel 32 for receiving high-speed communication cables. For example, ports 36 may comprise standard RJ-45 sockets for connecting to Ethernet cables. Alternatively, the ports may comprise receptacles for electrical or optical connectors and/or transceivers of other types. Further alternatively or additionally, cards 34 may be designed for other input/output (I/O) functions, and not only network communications. The term "communication adapter card" is therefore used in the context of the present patent application and in the claims to refer to any and all such network and I/O adapter cards, and the term "port" may refer to any sort of cable connector that is suitable for use on such cards.

Typically, ports 36 and associated circuitry on cards 34 (as described below) are capable of operating at network or I/O speeds of at least 1 Mb/s, and speeds of more than 10 Gb/s may be supported. Although the embodiment pictured in FIG. 1 has four ports on each card and three cards in total, the network appliance may alternatively comprise smaller or larger numbers of communication adapter cards, with smaller or larger numbers of port on each card. The cards and ports may all be of the same type, as shown in the figures, or they may alternatively mix different types.

Network adapter cards 34 plug into a backplane 48, which is mounted in the middle of case 22. For this purpose, cards 34 comprise bus connectors 52, which plug into backplane slots (illustrated in FIG. 5) on backplane 48. These bus connectors and backplane slots are compatible (in terms of the signals they receive and transmit) with bus links 27 on motherboard 24. For example, bus connectors 52 may comprise PCI ExpressModule connectors, or they may comprise other connector types that are electrically compatible with the PCI Express bus but have a different mechanical configuration. The configuration of such connectors in appliance 20 facilitates insertion and removal of cards 34 via front panel 32 of case 22. Examples of suitable electrical designs for cards 34 and backplane 48 are shown below in FIGS. 4A, 4B and 5.

The backplane slots are typically coupled via bus repeater circuits (shown in FIG. 5) to receptacles 40 on backplane 48. These receptacles connect via cables 42, such as high-speed twinax cables, to cards 38. Each cable 42 has a connector 40 for connecting to the inner side of the respective card 38 and a connector 44 for insertion into the respective receptacle 40 on the backplane.

Network adapter cards 34 are housed in a chassis 50, which permits the cards to be inserted and removed via front panel 32. This arrangement makes it possible to replace the network adapter cards without removing appliance 20 from its rack or opening case 22. Cards 34 are mounted horizontally in this embodiment, i.e., with the cards parallel to the motherboard and in a horizontal orientation when appliance 20 is mounted in a standard vertical rack.

Optionally, appliance 20 may also comprise one or more storage drives 51, such as a hard disk or flash drive. These drives typically communicate with motherboard 24 via a suitable Serial Attached SCSI (SAS) interface or Serial Advanced Technology Attachment (SATA) interface. As shown in FIG. 3, drive 51 may likewise be inserted and removed via front panel 32. The drive may plug into a suitable socket (not shown) on backplane 48, or it may alternatively connect to the motherboard by other means. Further alternatively or additionally, appliance 20 may be configured to receive other types of peripheral devices via front panel 32.

Example Circuits

Figure 4A:
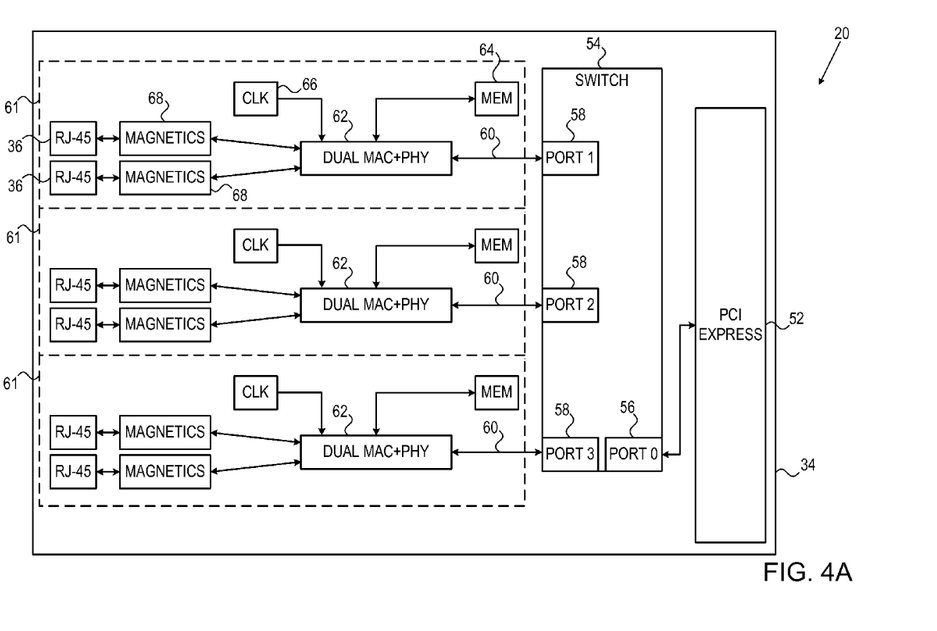
FIGS. 4A and 4B are block diagrams that schematically illustrate network adapter cards, in accordance with embodiments of the invention.

FIG. 4A is a block diagram that schematically shows functional and electrical details of network adapter card 34, in accordance with an embodiment of the invention. This is just one example of the possible design of such a card, shown here by way of illustration, and not limitation, as an aid in understanding the operation and benefits of some embodiments of the present invention. In this embodiment, card 34 comprises six ports 36, such as RJ-45 Ethernet connectors, as opposed to the four ports on each card that are shown in the preceding figures. The six ports are arranged in pairs in three processing channels 61 on card 34. In other respects, however, the functionality of card 34 is the same as that described above.

Bus connector 52 on card 34 transmits and receives PCI Express signals to and from backplane 48. A PCI Express switch 54 has one port 56 (labeled PORT 0) connected via a PCI Express link to connector 52 and three additional ports (PORT 1, 2, and 3) connected respectively via PCI Express links to channels 61. Each of the PCI Express links may comprise multiple lanes, depending on speed requirements.

Each processing channel 61 is built around a communication controller 62, which provides a dual Ethernet interface for the pair of ports 36. Typically, each interface comprises a physical layer interface (PHY) and a medium access control (MAC) interface. Controller may comprise a commercially-available integrated circuit device, such as an Intel® 82576 Gigabit Ethernet controller. Each controller 62 has a local memory 64 and clock 66 and is linked to port 36 via a magnetic interface (transformer) 68.

Figure 4B:
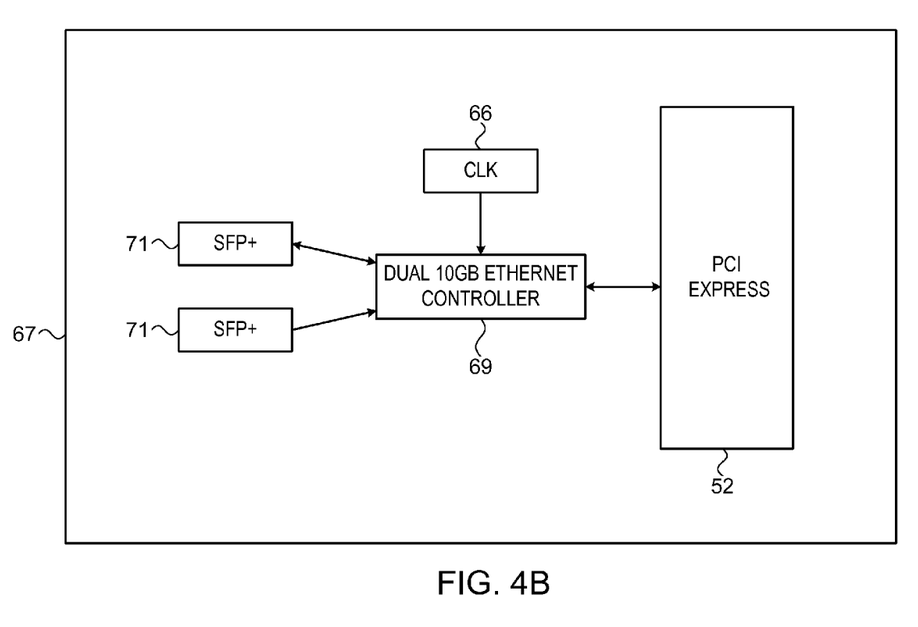

FIG. 4B is a block diagram that schematically shows details of a network adapter card 67, in accordance with another embodiment of the invention. This card, as another example, may be used in appliance 20 instead of or alongside the type of card 34 that is shown in FIG. 4A. As noted above, other types of network adapter cards, as well as other types of I/O adapter cards, may be used in the same fashion.

Card 67 comprises a dual-port 10 Gb/s Ethernet controller 69, such as an Intel 82599 device, which communicates with bus connector 52 and is timed by clock 66. Controller 69 performs Ethernet PHY and MAC functions. Controller 69 is connected via a standard XFI interface to two SFP+10 Gb/s optical transceivers 71, which serve as active ports for connection to fiberoptic cables (not shown).

Figure 5:
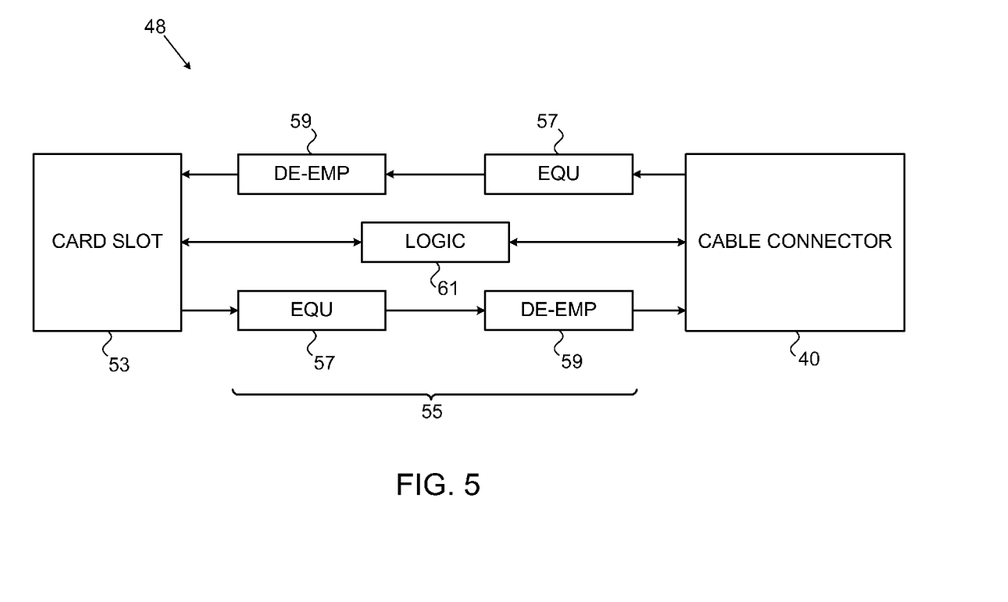
FIG. 5 is a block diagram that schematically illustrates a backplane, in accordance with an embodiment of the invention.

FIG. 5 is a block diagram that schematically shows functional and electrical details of backplane 48, in accordance with an embodiment of the invention. For each network adapter card 34, cable connector 40 connects via cable 42 to the respective card 38 that is plugged into motherboard 24 (FIGS. 1, 2). A PCI Express-compatible card slot 53 in backplane 48 receives connector 52 of network adapter card 34. (As noted above, slot 53 is electrically compatible with PCI Express but has a different mechanical form factor.) Alternatively, multiple card slots 53 may share the same cable connector and card 38.

Backplane 48 may include a bus repeater circuit 55, connected in between cable connector 40 and card slot 53. This circuit is used to maintain good bus signal quality, compatible with PCI Express requirements, over the relatively large distance between motherboard 24 and network adapter cards 34. For each link direction, circuit 55 comprises an equalizer 57, for reducing inter-symbol interference resulting from long signal traces and cables by boosting the gain of high-frequency signal components in the received bus signals, and a de-emphasizer and output controller 59, which provide optimum output power and signal quality. The backplane may include logic 61 for converting certain PCI Express control signals to meet the requirements of cards 34.

Alternative Embodiment

Figure 6:
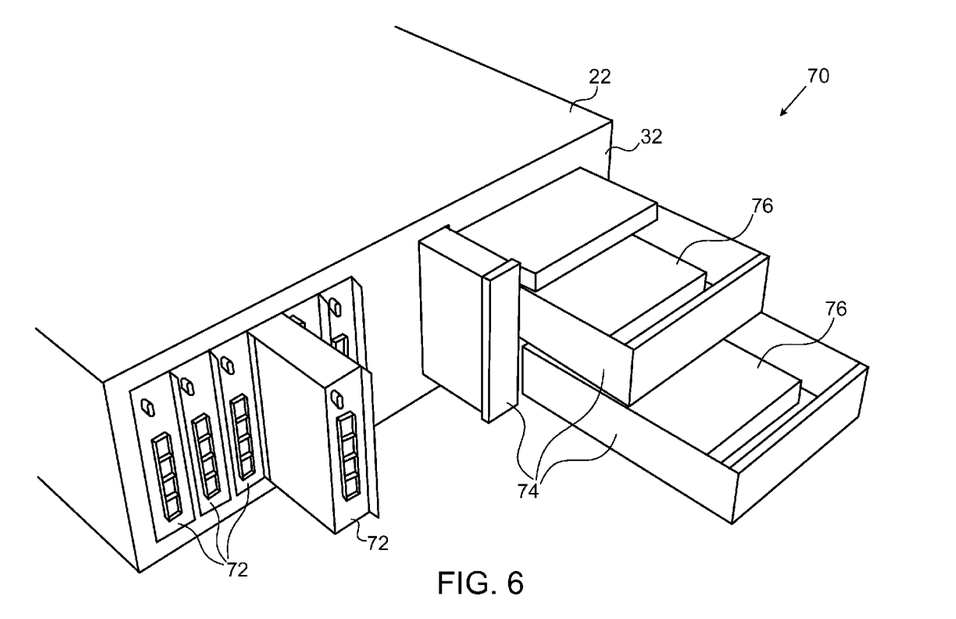
FIG. 6 is a schematic, pictorial illustration of a network appliance, in accordance with another embodiment of the invention.
Figure 7:
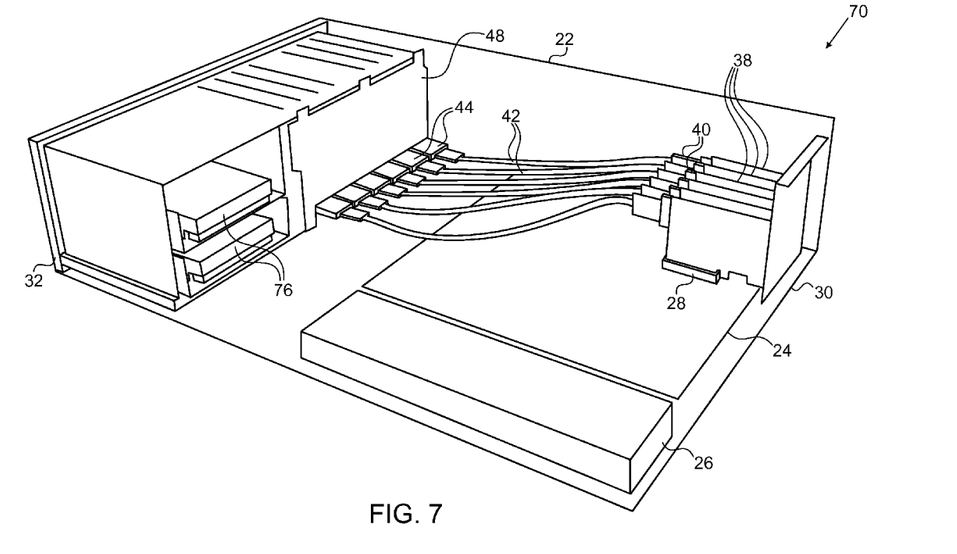
FIG. 7 is a schematic internal view of the network appliance of FIG. 6.

FIGS. 6 and 7 schematically illustrate a network appliance 70, in accordance with another embodiment of the invention. FIG. 6 is a pictorial illustration of the front side of the appliance, while FIG. 7 is a pictorial rear view. Elements of this embodiment that are functionally similar to those of the preceding embodiment are marked with the same indicator numbers.

Appliance 70, like appliance 20, is rack-mountable, but has a larger form factor, such as 3U or 4U. This form factor makes it possible to mount network adapter cards 72 vertically in case 22, i.e., perpendicular to motherboard 24. As in the preceding embodiment, cards 72 are accessible, as well as replaceable, via front panel 32.

In addition, appliance 70 accommodates modules 74 of other types, which may be vertically or horizontally mounted in case 22 and may have different form factors, as shown in FIG. 6. These modules may contain storage drives 76 or other peripheral devices.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. Communication apparatus, comprising:
   a case comprising a front panel and having a rear side opposite the front panel;

a computer motherboard, which comprises a processor and a bus having bus slots, and which is mounted in the case so that the bus slots are located adjacent to the rear side of the case;

one or more communication adapter cards, each of which comprises a bus connector compatible with the bus and one or more ports for receiving a communication cable, and which are mounted in the case so that the ports are accessible at the front panel; and bus extension circuitry, which is connected inside the case between the bus slots on the motherboard and the one or more communication adapter cards in a manner that maintains a PCI express bus connection between the motherboard and the communication adapter cards, and which comprises a backplane comprising at least one backplane slot, for receiving the bus connector of the one or more communication adapter cards.

2. The apparatus according to claim 1, wherein the bus extension circuitry comprises a bus repeater circuit coupled between the bus slots on the motherboard and the at least one backplane slot.

3. The apparatus according to claim 1, wherein the case is configured for mounting in a rack, and wherein the one or more communication adapter cards are insertable and removable via the front panel while the apparatus is mounted in the rack.

4. The apparatus according to claim 2, wherein the case has a form factor equal to 1U or 2U.

5. The apparatus according to claim 1, wherein the motherboard and at least one of the communication adapter cards are mounted horizontally in the case.

6. The apparatus according to claim 1, wherein the motherboard is mounted horizontally in the case while at least one of the communication adapter cards is mounted vertically in the case.

7. The apparatus according to claim 1, wherein the one or more communication adapter cards comprise a communication device for transmitting and receiving signals via the communication cable, and wherein the bus and the communication device are capable of operating at speeds of at least 1 Gb/s.

8. The apparatus according to claim 7, wherein the bus and the communication device are capable of operating at speeds of at least 10 Gb/s.

9. The apparatus according to claim 7, wherein the bus is a high-speed serial bus.

10. The apparatus according to claim 1, wherein the bus extension circuitry comprises at least one plug-in card, which plugs into at least one of the bus slots on the motherboard, and a bus cable, coupled between the at least one plug-in card and the backplane.

11. A method for communication, comprising:
providing a case comprising a front panel and having a rear side opposite the front panel;
mounting a computer motherboard, which comprises a processor and a bus having bus slots, in the case so that the bus slots are located adjacent to the rear side of the case;
mounting one or more communication adapter cards, each of which comprises a bus connector compatible with the bus and one or more ports for receiving a communication cable, in the case so that the ports are accessible at the front panel; and connecting bus extension circuitry between the bus slots on the motherboard and the one or more communication adapter cards in a manner that maintains a PCI express bus connection between the motherboard and the communication adapter cards, wherein the bus extension circuitry comprises a backplane comprising at least one backplane slot, for receiving the bus connector of the one or more communication adapter cards.

12. The method according to claim 11, wherein connecting the bus extension circuitry comprises coupling a bus repeater circuit between the bus slots on the motherboard and the at least one backplane slot.

13. The method according to claim 11, wherein the case is configured for mounting in a rack.

14. The method according to claim 13, and comprising inserting or removing the one or more communication adapter cards via the front panel while the case is mounted in the rack.

15. The method according to claim 13, wherein the case has a form factor equal to 1U or 2U.

16. The method according to claim 11, wherein the motherboard and at least one of the communication adapter cards are mounted horizontally in the case.

17. The method according to claim 11, wherein the motherboard is mounted horizontally in the case while at least one of the communication adapter cards is mounted vertically in the case.

18. The method according to claim 11, and comprising transmitting and receiving signals via the communication cable from and to the communication adapter cards and transmitting and receiving data via the bus extension circuitry at speeds of at least 1 Gb/s.

19. The method according to claim 18, wherein the bus is a high-speed serial bus.

20. The method according to claim 11, wherein connecting the bus extension circuitry comprises plugging at least one plug-in card into at least one of the bus slots on the motherboard, and coupling a bus cable between the at least one plug-in card and the backplane.

21. The apparatus according to claim 2, wherein the repeater comprises in its signal path substantially only an equalizer and a de-emphasizer.

22. The apparatus according to claim 2, wherein the bus extension circuitry comprises a de-emphasizer and an equalizer.

23. The apparatus according to claim 1, wherein the bus extension circuitry maintains the bus connection between the motherboard and the communication adapter cards without an intervening I/O or network switch.

24. The method according to claim 12, wherein coupling a bus repeater circuit comprises coupling a bus repeater circuit including in its signal path substantially only an equalizer and a de-emphasizer.

25. The method according to claim 12, wherein coupling a bus repeater circuit comprises coupling a bus repeater circuit including a de-emphasizer and an equalizer.

26. The method according to claim 11, wherein connecting the bus extension circuitry comprises connecting in a manner that maintains the bus connection between the motherboard and the communication adapter cards without an intervening I/O or network switch.

* * * * *